(12) United States Patent
Wang et al.

(10) Patent No.: US 8,670,894 B2
(45) Date of Patent: Mar. 11, 2014

(54) CONTROL SYSTEM AND METHOD FOR SENSOR SIGNAL OUT OF RANGE DETECTION

(75) Inventors: Wenbo Wang, Novi, MI (US); Daniel P. Grenn, Highland, MI (US); John F. Van Gilder, Webberville, MI (US); Michael J. Lucido, Northville, MI (US); Ian J. MacEwen, White Lake, MI (US); Hamid M. Esfahan, Ann Arbor, MI (US)

(73) Assignee: GM Global Technology Operations LLC

( * ) Notice: Subject to any disclaimer, the term of this patent is extended or adjusted under 35 U.S.C. 154(b) by 778 days.

(21) Appl. No.: 12/431,134

(22) Filed: Apr. 28, 2009

(65) Prior Publication Data

US 2010/0274442 A1 Oct. 28, 2010

(51) Int. Cl.
*G01M 17/00* (2006.01)
(52) U.S. Cl.
USPC .......................................... 701/30.4; 701/31.1
(58) Field of Classification Search
USPC ......... 701/34, 30.4, 31.1, 33.6, 33.9; 340/438
See application file for complete search history.

(56) References Cited

U.S. PATENT DOCUMENTS

| | | | | |
|---|---|---|---|---|
| 5,400,018 | A * | 3/1995 | Scholl et al. | 340/10.3 |
| 5,864,773 | A * | 1/1999 | Barna et al. | 702/85 |
| 6,014,598 | A * | 1/2000 | Duyar et al. | 701/29 |
| 6,202,009 | B1 * | 3/2001 | Tseng | 701/34 |
| 6,668,220 | B2 * | 12/2003 | Remboski et al. | 701/33.9 |
| 6,721,639 | B2 * | 4/2004 | Raypole et al. | 701/34 |
| 6,843,537 | B2 * | 1/2005 | Babala et al. | 303/122.09 |
| 6,868,325 | B2 * | 3/2005 | Menon et al. | 701/100 |
| 6,975,936 | B2 * | 12/2005 | Akuzawa et al. | 701/114 |
| 7,076,347 | B2 * | 7/2006 | Lehner et al. | 701/34 |
| 7,593,796 | B2 * | 9/2009 | Prokhorov | 701/29 |
| 2003/0200014 | A1 * | 10/2003 | Remboski et al. | 701/29 |
| 2006/0047403 | A1 * | 3/2006 | Volponi et al. | 701/100 |
| 2006/0282200 | A1 * | 12/2006 | Thiel et al. | 701/34 |
| 2007/0213893 | A1 * | 9/2007 | Stevenson | 701/29 |
| 2009/0049898 | A1 * | 2/2009 | Elkolaly | 73/114.43 |

* cited by examiner

*Primary Examiner* — Darnell Jayne
*Assistant Examiner* — Stanton L Krycinski

(57) ABSTRACT

A method and control module for determining a sensor error includes a time-based diagnostic module generating a time-based diagnostic for a sensor and an event-based diagnostic module generating an event-based diagnostic for the sensor. A synchronizing module synchronizes the time-based diagnostic and the event-based diagnostic to obtain a diagnostic result. A fault indicator module generates a fault signal in response to the diagnostic result.

16 Claims, 5 Drawing Sheets

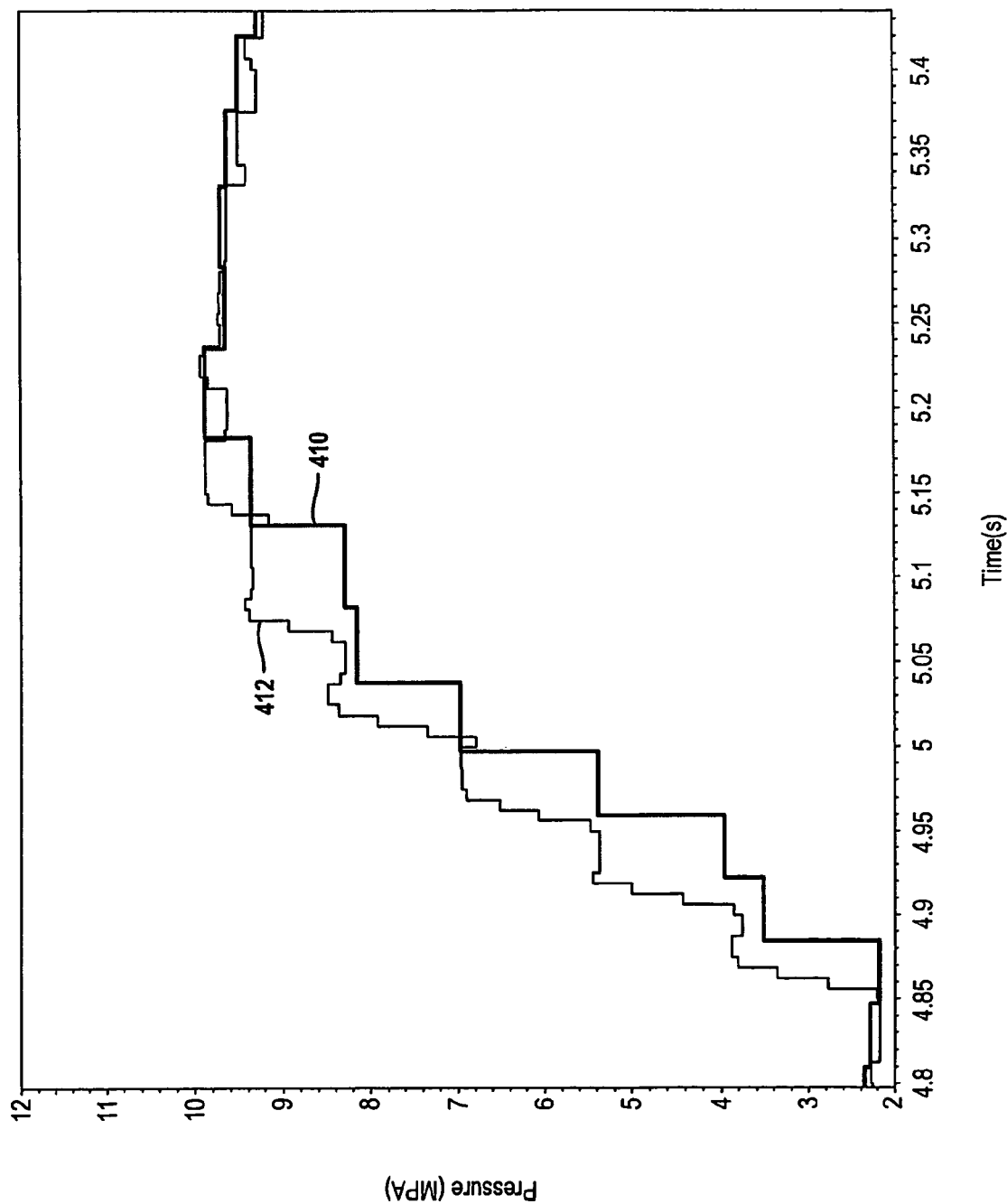

CONTROL SYSTEM AND METHOD FOR SENSOR SIGNAL OUT OF RANGE DETECTION

FIELD

The present disclosure relates to diagnostic systems for electronic control systems, and more particularly, to control systems and methods for detecting an out of range condition for sensors of the electronic control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Direct injection gasoline engines are currently used by many engine manufacturers. In a direct injection engine, highly pressurized gasoline is injected via a common fuel rail directly into a combustion chamber of each cylinder. This is different than conventional multi-point fuel injection that is injected into an intake tract or cylinder port.

Gasoline-direct injection enables stratified fuel-charged combustion for improved fuel efficiency and reduced emissions at a low load. The stratified fuel charge allows ultra-lean burn and results in high fuel efficiency and high power output. The cooling effect of the injected fuel and the even dispersion of the air-fuel mixture allows for more aggressive ignition timing curves. Ultra lean burn mode is used for light-load running conditions when little or no acceleration is required. Stoichiometric mode is used during moderate load conditions. The fuel is injected during the intake stroke and creates a homogenous fuel-air mixture in the cylinder. A fuel power mode is used for rapid acceleration and heavy loads. The air-fuel mixture in this case is a slightly richer than stoichiometric mode which helps reduce knock.

Direct-injected engines are configured with a high-pressure fuel pump used for pressurizing the injector fuel rail. A pressure sensor is attached to the fuel rail for control feedback. The pressure sensor provides an input to allow the computation of the pressure differential information used to calculate the injector pulse width for delivering fuel to the cylinder. Errors in the measured fuel pressure at the fuel rail result in an error in the mass of the fuel delivered to the individual cylinder.

SUMMARY

The present disclosure provides a method and system by which an error from the pressure sensor in the fuel rail may be quantified and used for closed-loop control. This will result in the proper mass of fuel being delivered to the individual cylinder. This may also allow for diagnostics of the fuel rail pressure sensor.

In one aspect of the invention, a method includes generating a time-based diagnostic, generating an event-based diagnostic, synchronizing the time-based diagnostic and the event-based diagnostic to obtain a diagnostic result and generating a fault signal in response to the diagnostic result.

In a further aspect of the invention, a control module for determining a sensor error includes a time-based diagnostic module generating a time-based diagnostic for a sensor and an event-based diagnostic module generating an event-based diagnostic for the sensor. A synchronizing module synchronizes the time-based diagnostic and the event-based diagnostic to obtain a diagnostic result. A fault indicator module generates a fault signal in response to the diagnostic result.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a plot of a time-based error versus an event-based error over time.

DETAILED DESCRIPTION OF THE PREFERRED EMBODIMENTS

The following description of the preferred embodiment is merely exemplary in nature and is in no way intended to limit the disclosure, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term boost refers to an amount of compressed air introduced into an engine by a supplemental forced induction system such as a turbocharger. The term timing refers generally to the point at which fuel is introduced into a cylinder of an engine (fuel injection) is initiated.

Figure 1:
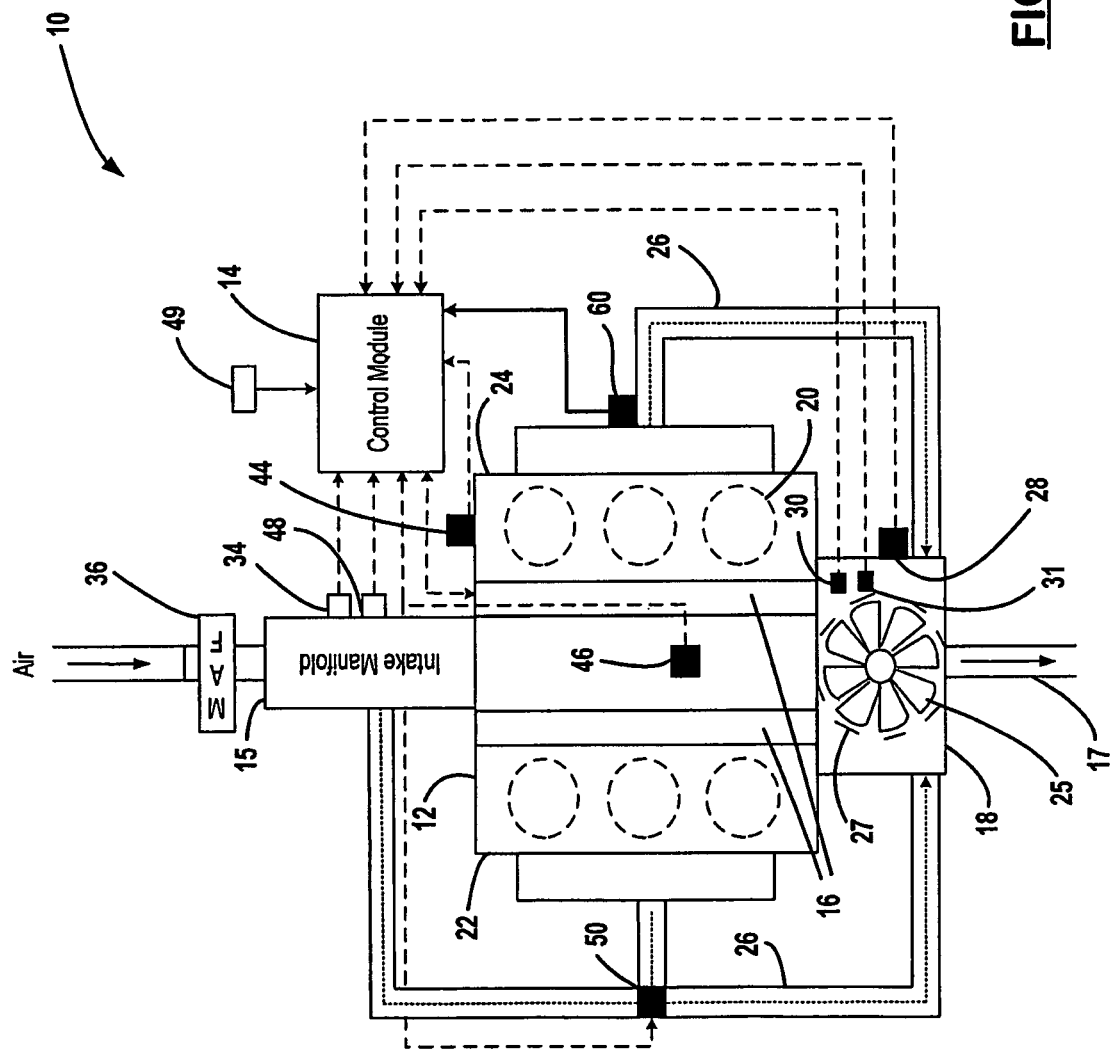
FIG. 1 is a functional block diagram of a control system that adjusts engine timing based on vehicle speed according to some implementations of the present disclosure.

Referring now to FIG. 1, an exemplary engine control system 10 is schematically illustrated in accordance with the present disclosure. The engine control system 10 includes an engine 12 and a control module 14. The engine 12 can further include an intake manifold 15, a fuel injection system 16 having fuel injectors (illustrated in FIG. 2.), an exhaust system 17 and a turbocharger 18. The exemplary engine 12 includes six cylinders 20 configured in adjacent cylinder banks 22, 24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration. While a gasoline powered internal combustion engine utilizing direct injection is contemplated, the disclosure may also apply to diesel or alternative fuel sources.

During engine operation, air is drawn into the intake manifold 15 by the inlet vacuum created by the engine intake stroke. Air is drawn into the individual cylinders 20 from the intake manifold 15 and is compressed therein. Fuel is injected by the injection system 16, which is described further in FIG. 2. The air/fuel mixture is compressed and the heat of compression and/or electrical energy ignites the air/fuel mixture. Exhaust gas is exhausted from the cylinders 20 through exhaust conduits 26. The exhaust gas drives the turbine blades 25 of the turbocharger 18 which in turn drives compressor blades 27. The compressor blades 27 can deliver additional air (boost) to the intake manifold 15 and into the cylinders 20 for combustion.

The turbocharger 18 can be any suitable turbocharger such as, but not limited to, a variable nozzle turbocharger (VNT). The turbocharger 18 can include a plurality of variable position vanes 27 that regulate the amount of air delivered into the engine 12 based on a signal from the control module 14. More specifically, the vanes 27 are movable between a fully-open position and a fully-closed position. When the vanes 27 are in the fully-closed position, the turbocharger 18 delivers a maximum amount of air into the intake manifold 15 and consequently into the engine 12. When the vanes 27 are in the fully-open position, the turbocharger 18 delivers a minimum amount of air into the intake manifold of engine 12. The amount of delivered air is regulated by selectively positioning the vanes 27 between the fully-open and fully-closed positions.

The turbocharger 18 includes an electronic control vane solenoid 28 that manipulates a flow of hydraulic fluid to a vane actuator (not shown). The vane actuator controls the position of the vanes 27. A vane position sensor 30 generates a vane position signal based on the physical position of the vanes 27. A boost sensor 31 generates a boost signal based on the additional air delivered to the intake manifold 15 by the turbocharger 18. While the turbocharger implemented herein is described as a VNT, it is contemplated that other turbochargers employing different electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the mass of air flowing into the intake manifold. The mass of the intake air can be used to determine the fuel supplied to the engine 12 based on the A/F ratio in response to engine start, catalyst light-off, and engine metal overheat protection. An RPM sensor 44 such as a crankshaft position sensor provides an engine speed signal. An intake manifold temperature sensor 46 generates an intake air temperature signal. The control module 14 communicates an injector timing signal to the injection system 16. A vehicle speed sensor 49 generates a vehicle speed signal.

The exhaust conduits 26 can include an exhaust recirculation (EGR) valve 50. The EGR valve 50 can recirculate a portion of the exhaust. The controller 14 can control the EGR valve 50 to achieve a desired EGR rate.

The control module 14 controls overall operation of the engine system 10. More specifically, the control module 14 controls engine system operation based on various parameters including, but not limited to, driver input, stability control and the like. The control module 14 can be provided as an Engine Control Module (ECM).

The control module 14 can also regulate operation of the turbocharger 18 by regulating current to the vane solenoid 28. The control module 14 according to an embodiment of the present disclosure can communicate with the vane solenoid 28 to provide an increased flow of air (boost) into the intake manifold 15.

An exhaust gas oxygen sensor 60 may be placed within the exhaust manifold or exhaust conduit to provide a signal corresponding to the amount of oxygen in the exhaust gasses.

Figure 2:
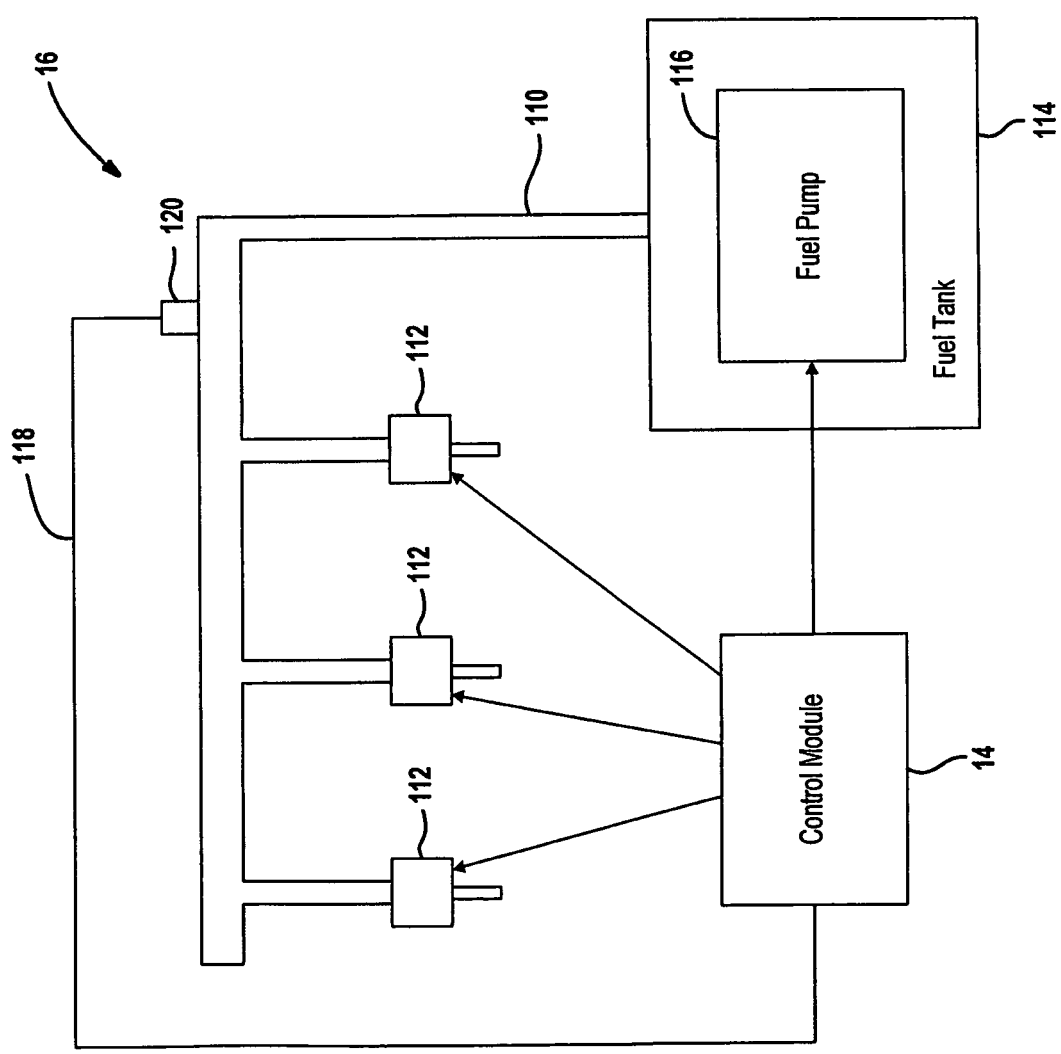
FIG. 2 is a functional block diagram of the fuel injection system according to the present disclosure.

Referring now to FIG. 2, the fuel injection system 16 is shown in further detail. A fuel rail 110 is illustrated having fuel injectors 112 that deliver fuel to cylinders of the engine. It should be noted that the fuel rail 110 is illustrated having three fuel injectors 112 corresponding to the three cylinders of one bank of cylinders of the engine 12 of FIG. 1. More than one fuel rail 110 may be provided on a vehicle. Also, more or fewer fuel injectors may also be provided depending on the configuration of the engine. The fuel rail 110 delivers fuel from a fuel tank 114 through a high-pressure fuel pump 116. The control module 14 controls the fuel pump 116 in response to various sensor inputs including an input signal 118 from a pressure sensor 120. The control module 14 also controls the injectors 112. The operation of the system will be further described below.

Figure 3:
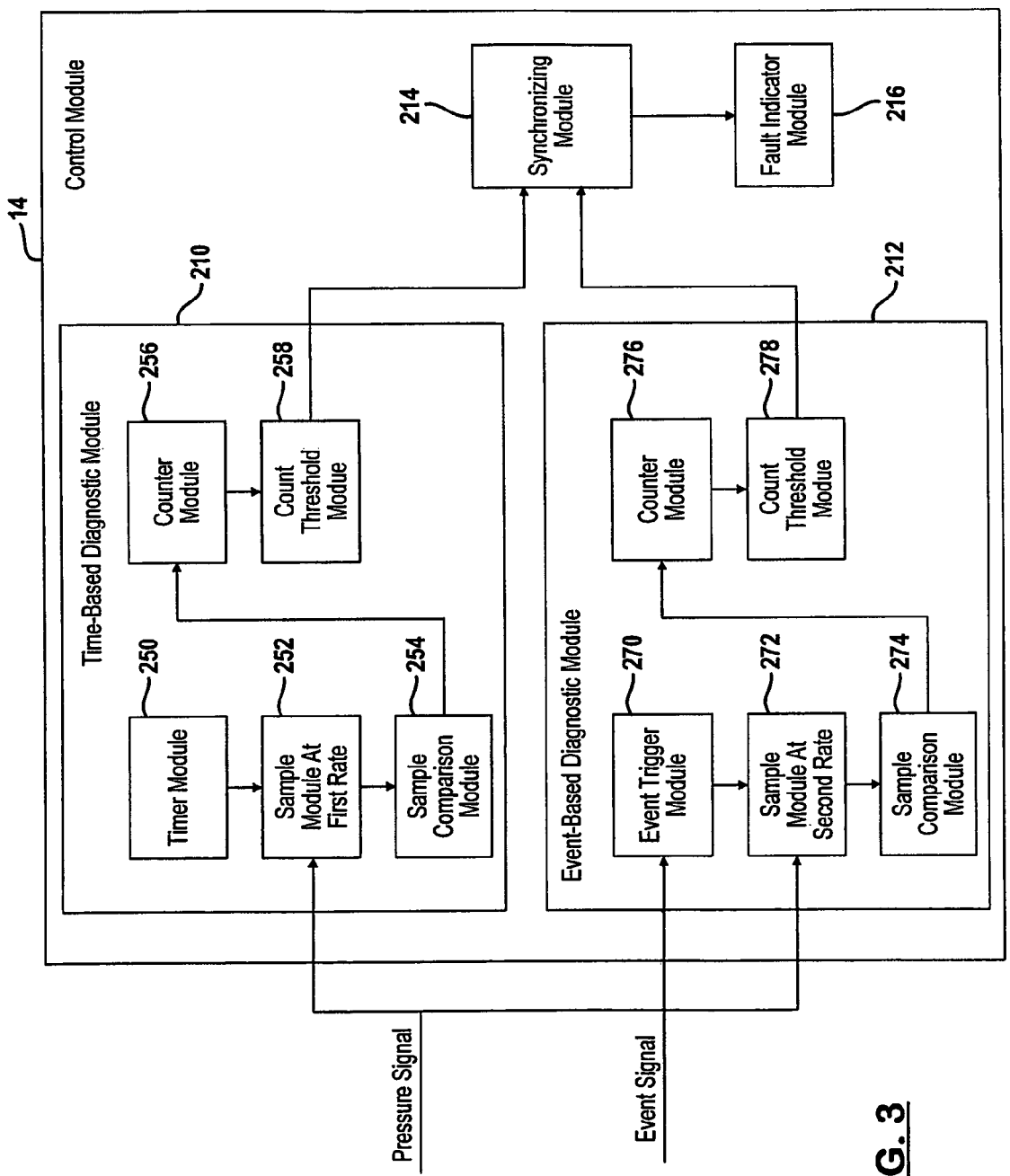
FIG. 3 is a block diagram of the control system of FIG. 1 for performing the method of the present disclosure.

Referring now to FIG. 3, the control module of FIG. 1 is illustrated in further detail. The control module 14 may include a time-based diagnostic module 210 and an event-based diagnostic module 212. The time-based diagnostic module 210 and the event-based diagnostic module 212 may provide two different methods for diagnosing a sensor such as a pressure sensor. The time-based diagnostic module 210 generates a time-based diagnostic signal and communicates the time-based diagnostic signal to a synchronizing module 214. The event-based diagnostic module 212 communicates an event-based diagnostic signal to the synchronizing module 214. The synchronizing module 214 communicates a synchronized diagnostic result to a fault indicator module 216.

The time-based diagnostic module 210 may include a timer module 250 that generates a timing signal capable of timing various time periods, including a sample time and an end time and therefore an overall time period. The timer module 250 also may time regular time intervals over which samples are to be taken. The timing signal from the timer module 250 is communicated to a sample module 252. The sample module 252 samples the sensor signal such as the pressure sensor signal used in this example. The sample module 252 samples at the intervals provided by the timer module 252. The sample module 252 may sample at a first rate which is different than a second rate used in the event-based diagnostic module. A sample comparison module 254 compares the samples to a comparison threshold. A counter-module 256 counts the number of comparisons that are above or below or both for a predetermined sample. Thus, the sample comparison module 254 may compare a pressure high threshold and a pressure low threshold with the sample and thus the number of counts above a high-pressure threshold or below a low-pressure threshold may be counted in the counter module 256. In block 258, the counts from the counter module 256 are compared to a counter-threshold which in turn may be communicated to the synchronizing module 214.

When the time-based diagnostic module is used alone, a faulty sensor may be detected too late at high RPMs while using many faulty signals. At low RPMs the diagnostic test may pass too soon for a good sensor.

The event-based diagnostic module 212 generates an event-based diagnostic signal. An event may, for example, be an engine-synchronized event. The event signal for triggering the sample may be received at the event trigger module 270. The event trigger module 270 may receive various types of signals including an engine synchronization event such as a camshaft or crankshaft timing signal. The sample module may sample the sensor signal such as the pressure sensor signal at a different rate than the time-based diagnostic module 210. Of course, the same rate may also be used. The sample module 272 generates sample signals and communicates the sample signals to a sample comparison module 274. The sample module at the second rate 272 receives an input from the first rate sample module 252. The sample comparison module 274 compares each sample to a threshold. The thresholds may be pressure-high thresholds and pressure-low thresholds as described above. Therefore, the counter module 276 may generate a count of the number of pressure-high signals and pressure-low signals. The number of counts counted by the counter 276 is compared to a count threshold in a count threshold module 278. The count threshold module 278 generates an event-based diagnostic and communicates the event-based diagnostic to the synchronizing module 214.

The synchronizing module 214 may include a table that contains the current state of the time-based and event-based results. The time-based and the event-based results may start and stop at different times relative to each other. When one of the tests fails, the other test may be discontinued until desired again, or both tests may be allowed to run to completion. This depends on the desired goals for the particular product. For the event-based or engine-synchronized system, the test may pass too soon for a good sensor at high RPMs or may fail too late for a bad sensor at low RPMs. Thus, both the time-based diagnostic and the event-based diagnostic have drawbacks. Because of the different sample rates in the time-based diagnostic module 210 and the event-based diagnostic module 212, improved results may be obtained. The synchronization module 214 may send a failure signal or a fault indicator to the fault indicator module 216 when either sensor fails a test. When both sensors pass a test, a passing sensor may be indicated with no fault. The synchronization module may also perform a balancing of the conditions in the synchronization module for a high RPM state or a low RPM state of the engine may be provided. Thus, balancing may occur based on the speed of the engine. Engine-synchronized diagnostics may be used at high RPMs while time-based may be used at low RPMs.

Figure 4:
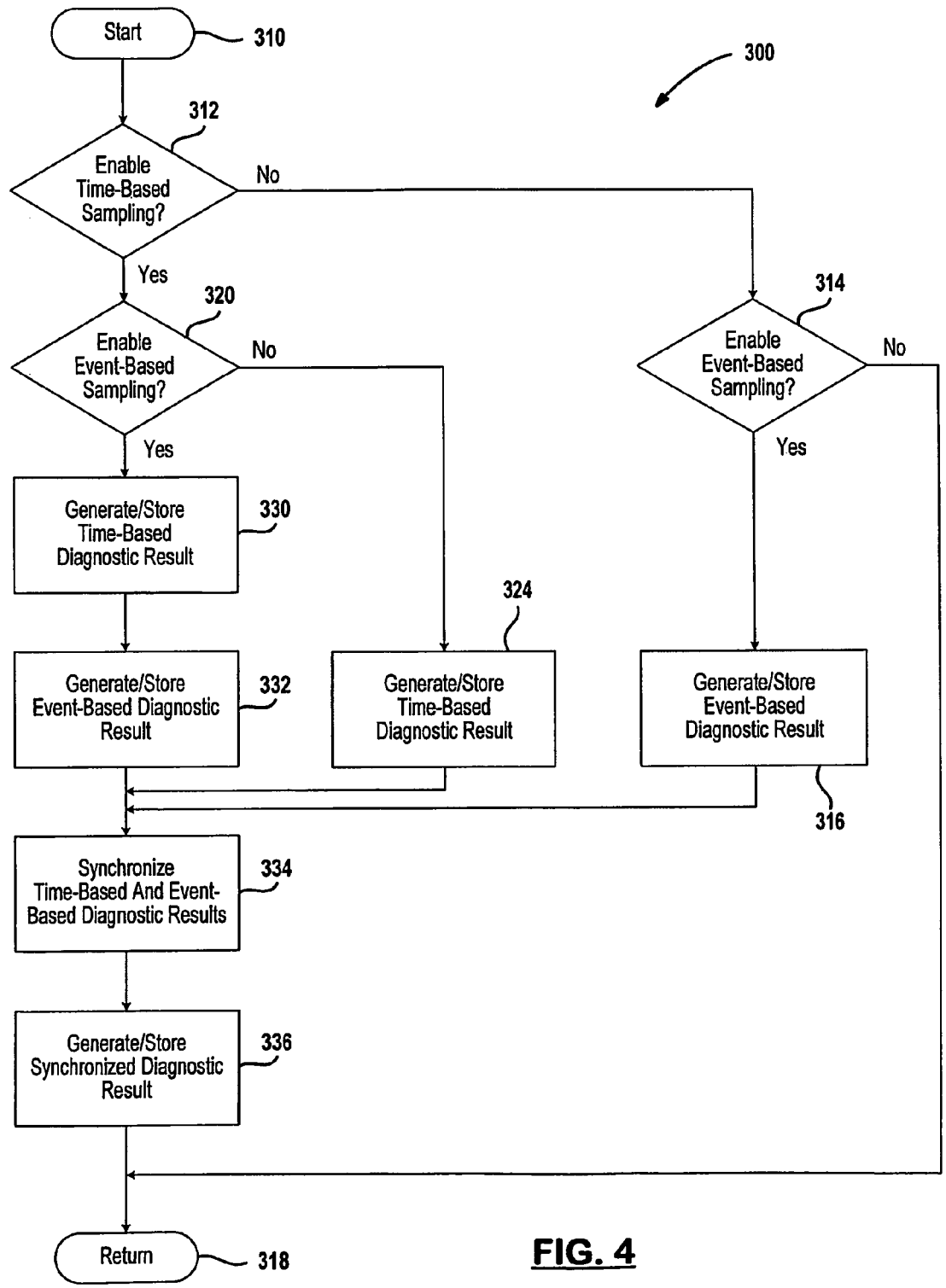
FIG. 4 is a flowchart of a method for determining a pressure sensor error.

Referring now to FIG. 4, a method 300 for operating this system is set forth. In step 310, the system starts. In step 312, it is determined whether time-based sampling is enabled. If time-based sampling is not enabled step 314 determines whether event-based sampling is enabled. If event-based sampling is enabled, step 316 generates and stores event-based diagnostic results. Referring back to step 312, if time-based sampling is enabled, step 320 determines whether event-based sampling has been enabled. If event-based sampling has not been enabled, step 324 generates and stores time-based diagnostic results. The system is capable of one or both types of diagnostics.

Referring back to step 320, if both time-based sampling has been enabled and event-based sampling has been enabled, step 330 generates and stores time-based diagnostic results while step 332 generates and stores event-based diagnostic results. As mentioned above, both the time-based diagnostic result and the event-based diagnostic results may take place over different time periods and may have different sampling rates. In step 334, the time-based and event-based diagnostic results are synchronized as described above. The outputs of steps 316 and 324 are also provided to step 334 for synchronization. Synchronization may be performed when required if both event-based and time-based diagnostic results are provided. In step 336, the synchronized diagnostic result is generated and stored. The diagnostic result may be used to generate a fault indicator or provide an indicator through an on-board diagnostic system that a particular sensor has failed. While the above example uses a pressure sensor such as a fuel rail pressure sensor, various types of pressure sensors and other types of sensors through the system may be used.

Referring now to FIG. 5, a time-based pressure signal 412 is illustrated compared to an event-based pressure signal 410. As can be seen, the results are different particularly early on in the timing of a transient pressure change. Later on in the timing, the two results converge. Therefore, synchronization between the time-based signal and the event-based signal is desirable to provide more accurate determination of errors.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic method for a vehicle, the diagnostic method performed using a control module and comprising:
   sampling a signal from a sensor a predetermined sampling rate to generate first samples;
   generating a time-based diagnostic signal based on the first samples;
   sampling the signal from the sensor each time when an event occurs to generate second samples;
   generating an event-based diagnostic signal based on the second samples;
   determining a diagnostic result based on the event-based diagnostic signal and the time-based diagnostic signal; and
   generating a fault signal corresponding to a sensor error in response to the diagnostic result.

2. The diagnostic method of claim 1 wherein the sensor comprises a pressure sensor.

3. The diagnostic method of claim 1 wherein generating a time-based diagnostic signal comprises generating the time-based diagnostic signal during a first period, and wherein generating an event-based diagnostic signal comprises generating the event-based diagnostic signal during a second period.

4. The diagnostic method of 3 wherein the first period is the same as the second period.

5. The diagnostic method of claim 3 wherein the first period is different than the second period.

6. The diagnostic method of claim 1 further comprising:
   determining a number of the first samples that are greater than a threshold; and
   when the number exceeds the threshold, generating the time-based diagnostic signal to indicate a time-based fault.

7. The diagnostic method of claim 1 wherein occurrence of the event is based on crankshaft rotation or engine speed.

8. The diagnostic method of claim 1 further comprising:
   determining a number of the second samples that are greater than a threshold; and
   when the number exceeds the threshold, generating the event-based diagnostic signal to indicate an event-based fault.

9. The diagnostic method of claim 1 wherein generating a time-based diagnostic signal comprises generating the time-based diagnostic signal based on a first pressure and wherein generating an event-based diagnostic signal comprises generating the event-based diagnostic signal based on the first pressure, wherein the first pressure is above a predetermined pressure.

10. The diagnostic method of claim 1 wherein generating a time-based diagnostic signal comprises generating the time-based diagnostic signal based on a first pressure and wherein generating an event-based diagnostic signal comprises generating the event-based diagnostic signal based on the first pressure, wherein the first pressure is below a predetermined pressure.

11. A control module of a vehicle, comprising:
- a time-based diagnostic module sampling a signal from a sensor at a predetermined sampling rate to generate first samples and generating a time-based diagnostic signal based on the first samples;
- an event-based diagnostic module sampling the signal from the sensor each time when an event occurs to generate second samples and generating an event-based diagnostic signal based on the second samples;
- a synchronizing module determining a diagnostic result based on the event-based diagnostic signal and the time-based diagnostic signal; and
- a fault indicator module generating a fault signal in response to the diagnostic result.

12. The control module of claim 11 wherein the time-based diagnostic module generates the time-based diagnostic signal for the sensor during a first period, and wherein the event-based diagnostic module generates the event-based diagnostic signal during a second period.

13. The control module of claim 12 wherein the first period is different than the second period.

14. The control module of claim 11 wherein the time-based diagnostic module generates the time-based diagnostic signal for the sensor at a first rate, and wherein the event-based diagnostic module generates the event-based diagnostic signal at a second rate.

15. The control module of claim 14 wherein the first rate is different than the second rate.

16. A control system comprising:
- the control module as recited in claim 11; and
- wherein the sensor comprises a pressure sensor.

* * * * *